(12) United States Patent
Burns

(10) Patent No.: US 7,641,012 B2
(45) Date of Patent: Jan. 5, 2010

(54) MODULE-LOCATING FASTENER AND METHOD OF MOUNTING ON A VEHICLE CHASSIS

(75) Inventor: Stephen F. Burns, Huntertown, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 516 days.

(21) Appl. No.: 11/537,203

(22) Filed: Sep. 29, 2006

(65) Prior Publication Data

US 2008/0093142 A1    Apr. 24, 2008

(51) Int. Cl.
    *B60R 16/04* (2006.01)
(52) U.S. Cl. .................. 180/68.5; 280/80.1; 280/781; 280/783; 280/785; 280/788; 296/187.01; 296/187.03; 296/187.09
(58) Field of Classification Search .............. 180/68.5; 280/80.1, 781, 783, 785, 788; 296/187.01
    See application file for complete search history.

(56) References Cited

U.S. PATENT DOCUMENTS

| | | | |
|---|---|---|---|
| 3,700,020 A | 10/1972 | Wallace | |
| 4,667,628 A | 5/1987 | Lopez-Crevillen | |
| 4,828,444 A | 5/1989 | Oshida | |
| 5,156,225 A * | 10/1992 | Murrin | 180/65.1 |
| 5,333,744 A | 8/1994 | LoCicero et al. | |
| 6,367,869 B1 * | 4/2002 | Baccouche et al. | 296/187.09 |
| 6,547,020 B2 * | 4/2003 | Maus et al. | 180/68.5 |
| 6,668,957 B2 * | 12/2003 | King | 180/68.5 |
| 6,824,168 B2 * | 11/2004 | Kawazu et al. | 280/834 |
| 7,066,531 B2 * | 6/2006 | Tomita | 296/187.03 |
| 7,128,179 B2 * | 10/2006 | Szymanski | 180/68.5 |
| 2001/0049056 A1 * | 12/2001 | Saito et al. | 429/175 |

OTHER PUBLICATIONS

Crest Products, Light Duty Stamped Fasteners, http://www.crestproducts.com/ViewProduct.asp?Category_ID=2.

* cited by examiner

*Primary Examiner*—Lesley D Morris
*Assistant Examiner*—Jacob Meyer
(74) *Attorney, Agent, or Firm*—Jeffrey P. Calfa; Mark C. Bach

(57) ABSTRACT

A method of mounting a battery box (10) on a frame rail (12). Fasteners and elements (36, 38; or 54, 56) provide spaced apart, axially tapered outer surfaces (46; 62) proximate a vertical side of the rail with the tapers narrowing toward the side of the rail. The box has tabs (28) having downwardly open throats (30). The box is hung on the rail by positioning the box so as to place each tab over a respective element (38 or 56) on the fastener (36 or 54) with the tab throat aligned with the element, and then lowering the box to cause the elements to enter the tab throats and the throats to come to rest on the elements so that at least some of the weight of the box is borne by the rail through the throats resting on the elements. With the throats resting on the elements, the tapered outer surfaces present axial interference to the tabs beyond the tabs relative to the rail. After the box has been hung, the box is fastened to the rail by additional fasteners.

15 Claims, 3 Drawing Sheets

MODULE-LOCATING FASTENER AND METHOD OF MOUNTING ON A VEHICLE CHASSIS

FIELD OF THE INVENTION

This invention relates generally to the mounting of large modules, such as battery boxes, on motor vehicles. More particularly, the invention relates to a method using special locating fasteners that allow a module to be hung on a generally vertical side surface of a chassis frame rail before other conventional fasteners, are tightened to securely fasten the module in place.

BACKGROUND OF THE INVENTION

Certain processes in the assembly of motor vehicles in an assembly plant require that a module be fastened to a generally vertical side surface of the vehicle structure. One example of this is the fastening of a battery box to the side of a chassis frame rail. Because larger modules like a battery box can have significant weight, it is preferable that an assembler not have to support the weight of the module while fastening it in place.

A prior method of assembling a battery box to a chassis frame rail comprises fastening two hanger brackets to the frame rail at mounting locations that are spaced apart along the length of the frame rail. The hanger brackets are stampings shaped to provide hanger hooks. The battery box has sides that include fastening formations shaped for association with the hanger brackets so as to allow the battery box to be hung on the hanger hooks before fasteners are run through the hanger brackets and the fastening formations in the sides of the battery box to securely fasten the battery box in place. In that way the weight of the box is borne by the frame rail and not by the assembler as the assembler is completing the fastening of the box to the frame rail.

SUMMARY OF THE INVENTION

The present invention provides an improvement over the prior method and fastening system because it does not use the separate brackets. Eliminating the brackets serves to reduce the number of unique parts that must be tooled and fabricated by a parts manufacturer and then stocked by an assembly plant. A weight savings may also result.

Because separate brackets are not used, the invention facilitates the assembly process by eliminating the need to first assemble the brackets to the frame rail before hanging and fastening the battery box.

One general aspect of the invention relates to a method of locating and supporting a module on a chassis of an automotive vehicle. A fastener and element having an axially tapered outer surface are disposed on the chassis so as to place the tapered outer surface proximate a generally vertical surface of the chassis with the taper of the tapered outer surface narrowing in the axial direction toward the generally vertical surface.

The module comprises a tab comprising a generally downwardly open throat. The module is hung from the fastener by positioning the module and generally vertical surface of the chassis relative to each other so as to place the tab over the element on the fastener with the throat of the tab aligned with the element, and then relatively positioning the module and generally vertical surface of the chassis so as to cause the element on the fastener to enter the throat of the tab and the throat to come to rest on the element so that at least some of the weight of the module is borne on the chassis through the throat resting on the element. With the throat resting on the element, the tapered outer surface presents an axial interference to the tab beyond the tab relative to the generally vertical surface.

A further aspect relates to one type of threaded fastener for use in hanging the module. The fastener comprising a main axis, a drive head at one axial end of an external spiral thread that runs along the main axis in one direction from the drive head, a radial flange at the junction of the drive head and the spiral thread, and a tapered annular flange that extends away from the drive head opposite the radial flange and that has a taper that narrows in the direction toward the radial flange.

A further aspect relates to another type of fastener, namely a fastener assembly that in use provides for the module to be hung on an externally spiral-threaded member at a predetermined location of the chassis. The fastener assembly comprises a nut that has a main axis and an external drive surface that can be engaged by a tool for turning the nut about the main axis to thread the nut onto the externally spiral-threaded member via an internal spiral thread that runs along the main axis of the nut. The nut also has a radial flange at one axial end, and the fastener assembly further comprises an annular cap fitted onto an axial end of the nut opposite the radial flange comprising an outer surface that has a narrowing taper toward the radial flange.

A further aspect relates to a vehicle chassis comprising a module having tabs each comprising a generally downwardly open throat and a chassis frame comprising a frame member from a generally vertical side of which spaced apart externally spiral-threaded members extend. Elements disposed on the threaded shanks abut the frame member and comprises tapered outer surfaces whose tapers narrow toward the generally vertical side of the frame member.

The elements are arranged in a pattern that registers the throats of the module tabs with the elements and relates each to the other such that the tabs are supported via the throats on the elements while the tapered outer surfaces present interference to the tabs preventing the module from coming off the elements unless the module is elevated sufficiently to move the tabs out of interference with the tapered outer surfaces.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
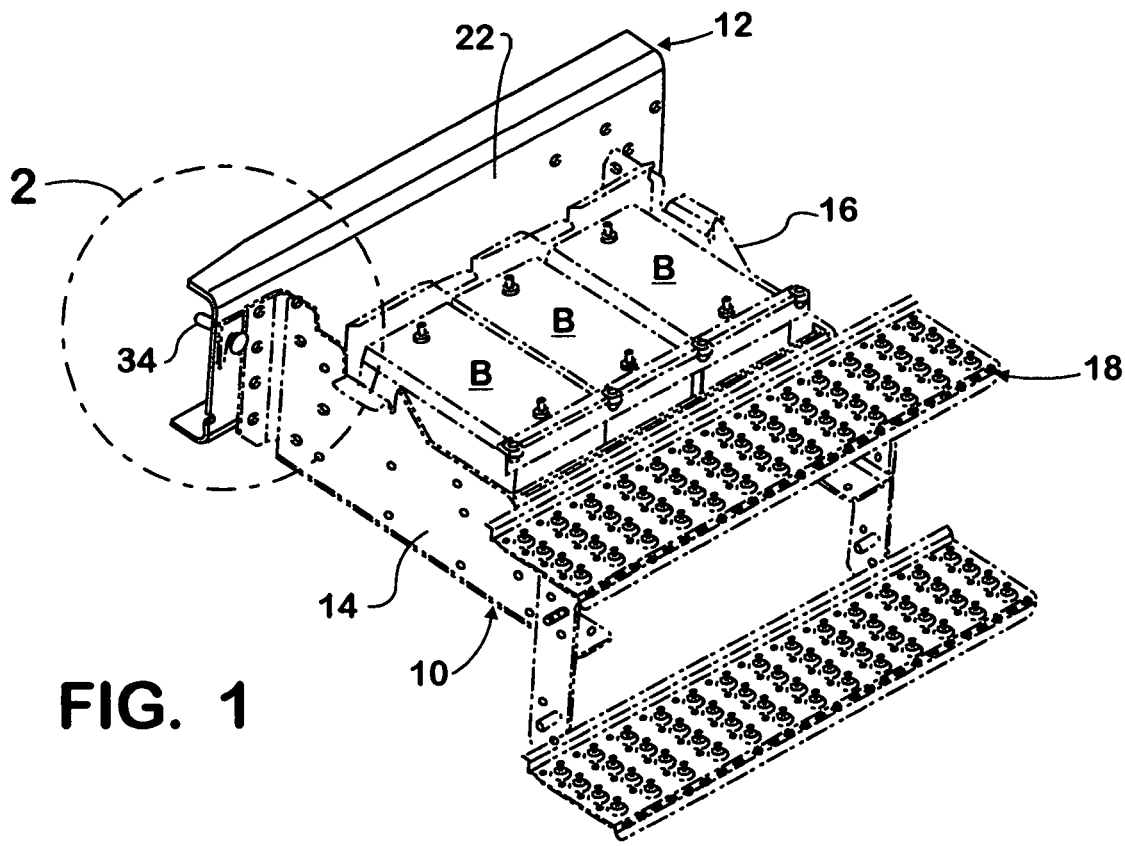
FIG. 1 is a perspective view illustrating a battery box hung on a frame side rail in accordance with principles of the present invention.

FIG. 1 shows a battery box 10 that has been hung on a side of a truck frame rail 12 that runs lengthwise of the truck.

Battery box 10 has sides 14, 16 that extend outboard of rail 12 and that support a battery tray (not visible in FIG. 1) to provide battery box space for a bank of electric storage batteries B. After the box has been mounted on the rail, the batteries are placed in the box and are typically secured in place by any suitable means that prevents the batteries from shifting yet allows them to be removed when needed. In this particular box 10, sides 14, 16 extend further outboard of the battery bank to provide a mounting for a set of steps 18 by which the truck cab can be entered and exited.

The inboard ends of sides 14, 16 are turned outward to form flanges 20. Only the flange 20 on side 14 is visible in the Figures. Flanges 20 are disposed against a generally vertical outside face 22 of rail 12, and each flange contains several through-holes 24 that are vertically spaced apart in a main part 26 of the flange.

At its top, each flange 20 is shaped to further comprise a locating tab 28 disposed further outward of its main part 26. The locating tabs comprise downwardly open throats 30 having edges 32 that are generally semi-circularly shaped at the top and have tapered sides that open outward in the downward direction, extending to the bottom of the tab.

Figure 4:
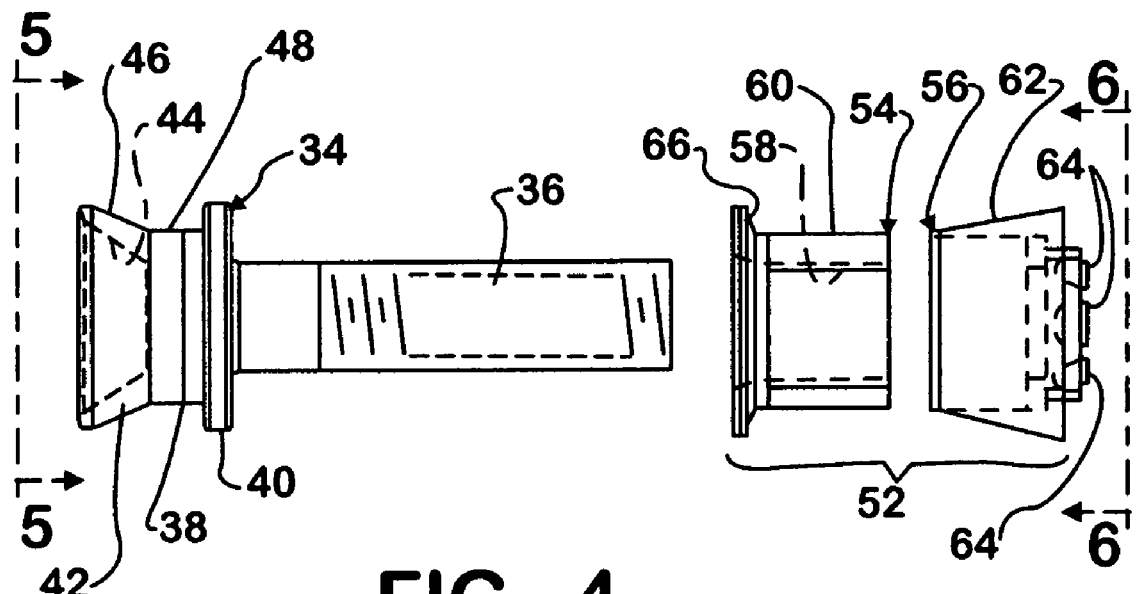
FIG. 4 is a longitudinal view of special fasteners used in hanging the battery box.
Figure 5:
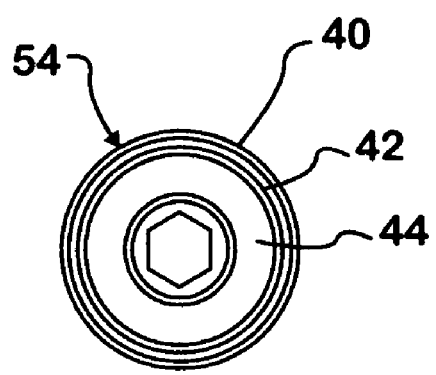
FIG. 5 is an axial end view in the direction of arrows 5-5 in FIG. 4.

A first type of special fastener 34 is located on rail 12 at the locations of tabs 28 to provide for box 10 to be hung on the rail. Detail of fastener 34 is shown in FIGS. 4 and 5. The fastener has a spiral threaded shank 36 and a drive head 38 at one end of the shank. Drive head 38 has a circular radial flange 40 at its junction with shank 36. Opposite flange 40, drive head 38 has an annular tapered flange 42 whose taper increases in the axial direction away from the drive head. This provides at that axial end of the fastener an open cavity 44 that leaves the central area of the drive head face open to allow a tool (not shown) to enter the cavity and engage a drive surface in the drive head for turning the fastener about its axis and threading it into a through-hole in rail 12.

Figure 2:
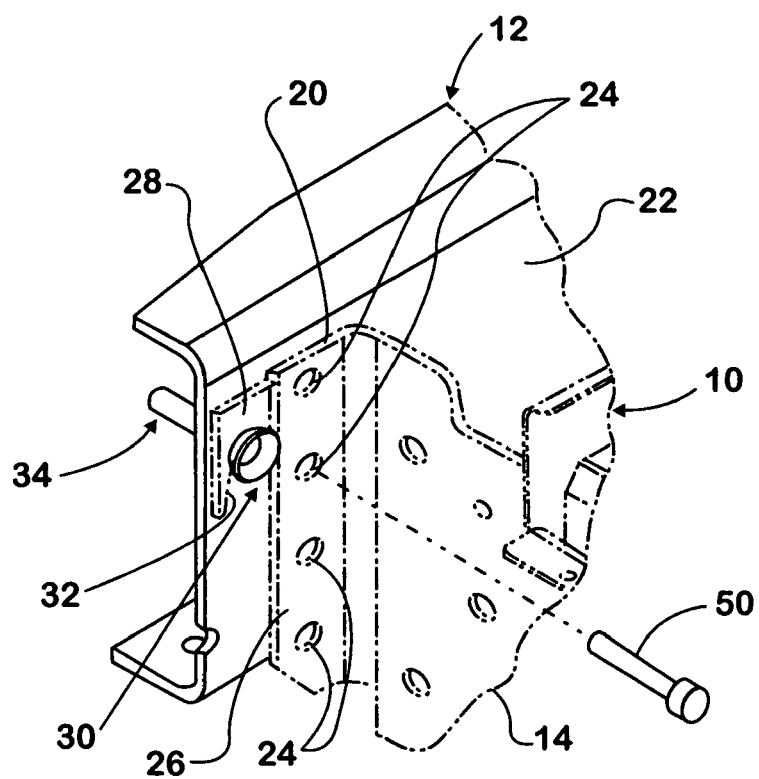
FIG. 2 is an enlarged view in circle 2 of FIG. 1.
Figure 3:
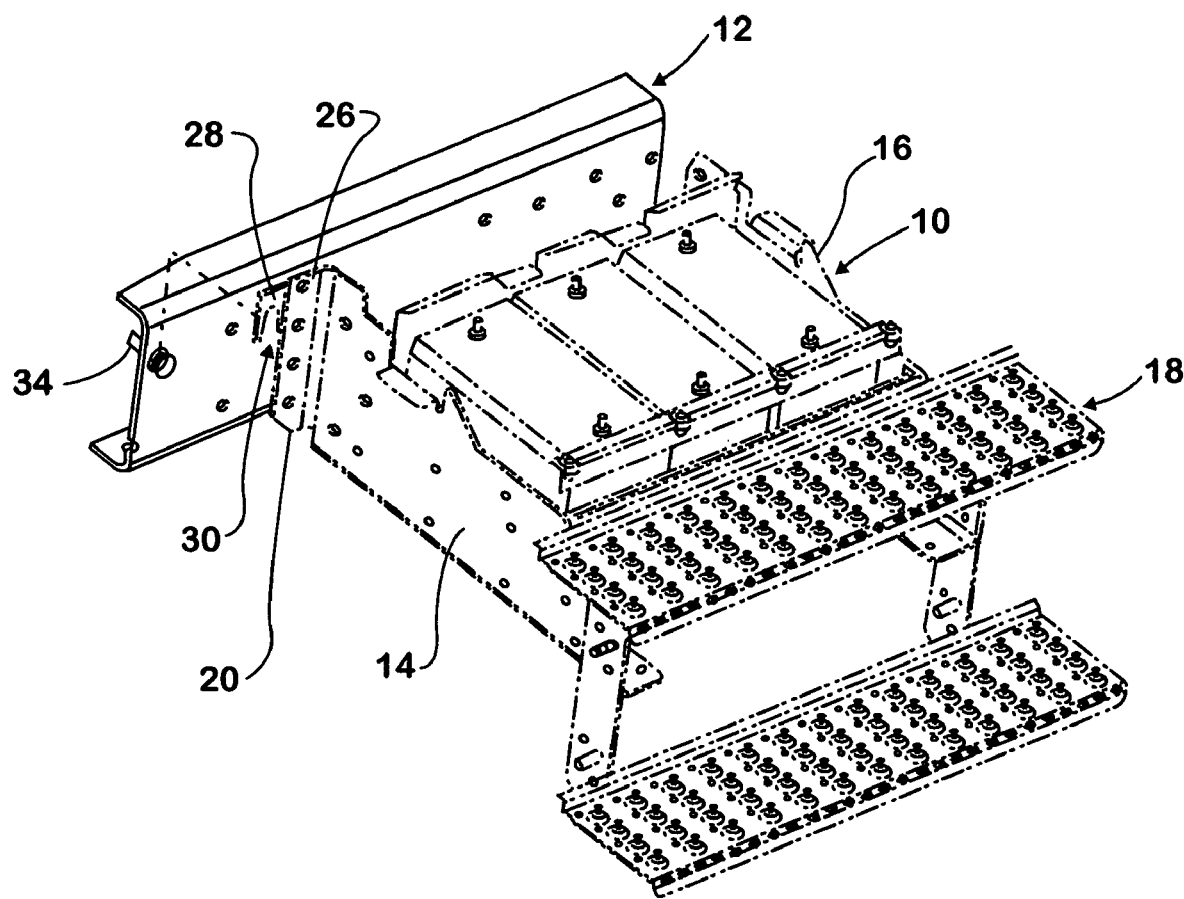
FIG. 3 is a view similar to FIG. 1 showing a condition prior to hanging the battery box on the side rail and indicating how the battery box is moved into hanging position.

FIGS. 1, 2, and 3 show fasteners 34 having been fastened to rail 12 from the outboard side and tightened in respective through-holes such that flanges 40 are abutting face 22. In that way an outer tapered surface 46 of flange 42 and an outer circular surface 48 of each drive head 38 protrude immediately beyond the respective flange 40. That allows box 10 to be hung on the fasteners by moving it from the position shown, as suggested by FIG. 3.

FIG. 3 suggests that box 10 be positioned relative to rail 12 to locate tabs 28 over the respective fasteners very close to face 22, with throats 30 aligned with the fasteners. In that position, box 10 can be lowered and in the process cause the respective fastener to enter the throat 30 of the respective tab 28. The mouth of each throat 30 has a width greater than the diameter of surface 48, and possibly even greater than the largest diameter of flange 42. Depending on specific part dimensions, either the tapered sides of throat edges 32 or the generally semi-circular tops of edges 32 will come to rest on either surface 46 or surface 48.

Preferably surface 48 has an axial dimension just slightly greater than the thickness of the respective tab 28 and a diameter just slightly less than that of the generally semi-circular top of edge 32 so that after the box has been hung, the top of edge 32 rests on surface 48, and substantially all of the weight of the box will be borne on rail 12 through fasteners 34.

With the box having been hung on the fasteners, flanges 42 prevent the box from coming off the fasteners because of the box's own overhanging weight. The only way the box can come off is if it is elevated off the fasteners sufficiently for tabs 28 to clear the flanges and then moved away from rail 12.

With the box hung on the fasteners, mounting of the box can be completed. Through-holes 24 register with through-holes in rail 12. The shanks of additional fasteners 50 (only one of which is shown in FIG. 2) are passed through holes 22 and tightened in the frame rail holes thereby securing the box to the frame rail. Fasteners 50 can be conventional fasteners, meaning ones that do not have flanges 42.

Figure 6:
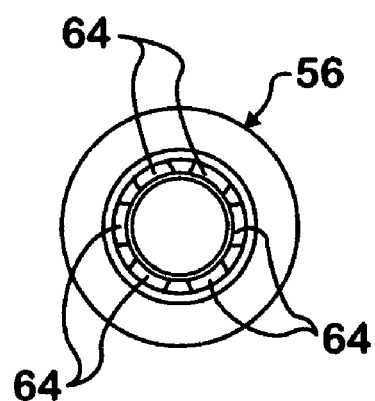
FIG. 6 is an axial end view in the direction of arrows 6-6 in FIG. 4.

FIGS. 4 and 6 also show another embodiment of special fastener, specifically a fastener assembly 52 comprising a nut 54 and an annular cap 56. Nut 54 has an internal spiral thread 58 and an external drive surface 60 that can be engaged by a tool for turning the fastener about the main axis of the assembly to thread the assembly onto an externally threaded member like shank 36 of fastener 34.

Annular cap 56 has an internal shape allowing it to be pushed onto one axial end of nut 54 after nut 54 has been tightened onto an externally threaded member like shank 36 of fastener 34. Cap 56 comprises an outer surface 62 that has a narrowing taper in a direction away from the one axial end of the nut after having been pushed onto the nut at that one axial end. The taper of surface 62 is preferably frustoconical. A circular array of six retention teeth 64 comes into engagement with the shank of the externally threaded member as the cap is being fitted onto the nut. A second end of the nut opposite the first end has a flange 66 that limits how far the cap can be pushed on.

From this description, it can be appreciated that nut 54 and cap 56, when assembled together, form an assembly 52 that is essentially functionally equivalent to the drive head and flange of fastener 34, and therefore capable of preventing a tab 28, when its throat 30 is placed on surface 62, from coming off unless the module containing the tab 28 is elevated sufficiently to cause the tab to clear outer surface 62 of cap 56, and then moved away. Depending on specific dimensions of parts and on how far cap 56 is pushed onto nut 54, the narrow end of surface 62 may abut flange 64, in which case the fastener assembly has no outer surface corresponding to the circular surface 48 of fastener 24, or if surface 62 stops short of flange 66, the exposed portion of the outer surface nut 54 would correspond to the circular surface 48 of fastener 24, but the exposed nut surface may be non-circular if it a portion of the drive surface.

While a presently preferred embodiment of the invention has been illustrated and described, it should be appreciated that principles of the invention are applicable to all embodiments that fall within the scope of the following claims.

What is claimed is:

1. A method of locating and supporting a module on a chassis of an automotive vehicle comprising:

disposing on the chassis both a fastener having a shank and element located on the shank, the element having an axially tapered outer surface, so as to place the axially tapered outer surface proximate a generally vertical surface of the chassis with the axially tapered outer surface narrowing in an axial direction toward the generally vertical surface of the chassis; and hanging on the chassis a module that comprises a tab comprising a generally downwardly open throat by positioning the module and the generally vertical surface of the chassis relative to each other so as to place the tab over the element on the shank of the fastener with the generally downwardly open throat of the tab aligned with the element, and then relatively positioning the module and the generally vertical surface of the chassis so as to cause the element on the shank of the fastener to enter the generally downwardly open throat of the tab, the generally downwardly open throat to come to rest on the element so that at least some of weight of the module is borne on the chassis through the generally downwardly open throat resting on the element, and with the generally downwardly open throat resting on the element, the axially tapered outer surface to present an axial interference to the tab beyond the tab relative to the generally vertical surface.

2. A method as set forth in claim 1 further comprising:

disposing on the chassis in spaced relation to the fastener and the element, a second fastener having a second shank and a second element located on the second shank, the second element having a second axially tapered outer surface, so as to place the second axially tapered outer surface of the second element proximate the generally vertical surface of the chassis with the second axially tapered outer surface of the second element of the second element narrowing in the axial direction toward the generally vertical surface; and during hanging of the module, also hanging the module from the second fastener and the second element by placing an additional tab of the module over the second element with a throat of the additional tab aligned with the second element, and relatively positioning the module and generally vertical surface of the chassis so as to cause the second element to enter the throat of the additional tab, the throat of the additional tab to come to rest on the second element so that at least some of weight of the module is borne on the chassis through the throat of the additional tab resting on the second element, and with the throat of the additional tab resting on the second element, the second axially tapered outer surface of the second element to present an axial interference to the additional tab beyond the additional tab relative to the generally vertical surface.

3. A method as set forth in claim 2 further comprising, after the module has been hung on the fasteners, the second fastener, the element and the second elements, fastening the module to the generally vertical surface at other locations by further fasteners that are tightened to force the module and the generally vertical surface together.

4. A method as set forth in claim 1 further comprising, after the module has been hung on the fastener and the element, fastening the module to the generally vertical surface at other locations by further fasteners that are tightened to force the module and the generally vertical surface together.

5. A method as set forth in claim 1 wherein the fastener has a threaded shank and a head.

6. A method as set forth in claim 1 wherein the fastener has an external spiral thread; further comprising the step of threading a nut onto the external spiral thread to push the element onto the nut toward the generally vertical surface.

7. A method as set forth in claim 6 further comprising engaging retention fingers on the element with the external spiral thread as the element is being pushed onto the nut.

8. A vehicle chassis comprising:

a module having tabs each comprising a generally downwardly open throat;

a chassis frame comprising a frame member from a generally vertical side of which spaced apart externally spiral-threaded members extend, elements disposed on threaded shanks abutting the frame member and comprising tapered outer surfaces whose tapers narrow toward the generally vertical side of the frame member, the elements being arranged in a pattern that registers the generally downwardly open throats of each of the tabs with the elements such that the tabs are supported via each of the generally downwardly open throats while the tapered outer surfaces present interference to the tabs preventing the module from coming off the elements unless the module is elevated sufficiently to move the tabs out of interference with the tapered outer surfaces.

9. A vehicle chassis as set forth in claim 8 wherein each of the tapered outer surfaces comprises a frustoconical taper.

10. A vehicle chassis as set forth in claim 8 wherein the externally spiral-threaded members are in threaded engagement with respective holes in the frame member, and each element comprises a drive head on each of the respective externally spiral-threaded members.

11. A vehicle chassis as set forth in claim 10 wherein each of the tapered outer surfaces comprises an annular flange extending axially of the respective drive head in a direction opposite the generally vertical side of the frame member.

12. A vehicle chassis as set forth in claim 8 wherein each element comprises a fastener assembly comprising a nut that has an internal spiral thread running along a main axis of the nut in threaded engagement with the respective externally spiral-threaded member and an external drive surface that can be engaged by a tool for turning the nut about the main axis, and a cap fitted onto one axial end of the nut and containing a tapered outer surface.

13. A vehicle chassis as set forth in claim 12 wherein a taper of the tapered outer surface of the caps is frustoconical.

14. A vehicle chassis as set forth in claim 12 wherein the cap comprises retention teeth that engage the respective externally spiral-threaded member.

15. A vehicle chassis as set forth in claim 8 wherein the module comprises a battery box for holding a bank of electric storage batteries.

* * * * *